United States Patent [19]

Gregg

[11] Patent Number: 4,509,786
[45] Date of Patent: Apr. 9, 1985

[54] SUPPORT FOR COLLAPSIBLE DRAG REDUCER

[75] Inventor: Willard W. Gregg, Troy, Mich.

[73] Assignee: General Motors Corporation, Detroit, Mich.

[21] Appl. No.: 439,755

[22] Filed: Nov. 8, 1982

[51] Int. Cl.³ .............................................. B62D 35/00
[52] U.S. Cl. .................................. 296/1 S; 292/263; 296/91
[58] Field of Search ................... 296/15, 91; 292/263

[56] References Cited

U.S. PATENT DOCUMENTS

| Re. 30,969 | 6/1982 | Buck, Jr. | 292/263 |
|---|---|---|---|
| 1,711,190 | 4/1929 | Wheaton | 292/263 |
| 2,038,901 | 4/1936 | Mollet | 292/263 |
| 2,173,890 | 9/1939 | Tuttle | 296/1 S |
| 3,259,936 | 7/1966 | Sheridan | 292/263 |
| 3,947,065 | 3/1976 | Geiger | 296/1 S |
| 4,047,747 | 9/1977 | Beers | 296/1 S |
| 4,056,279 | 11/1977 | Dorsch | 296/1 S |
| 4,082,340 | 4/1978 | Taylor | 296/1 S |
| 4,084,846 | 4/1978 | Wiley, Jr. et al. | 296/1 S |
| 4,156,543 | 5/1979 | Taylor et al. | 296/1 S |

FOREIGN PATENT DOCUMENTS 2501663 7/1976 Fed. Rep. of Germany ...... 296/1 S

*Primary Examiner*—Robert B. Reeves
*Assistant Examiner*—Dennis H. Pedder
*Attorney, Agent, or Firm*—Charles E. Leahy

[57] ABSTRACT

A support mechanism for moving a roof top pivotally mounted air deflector panel between raised and lowered positions includes a collapsible toggle linkage having a support link and a pivot link. The pivot link is pivotally mounted on the cab rear wall and has a handle by which an operator standing on the tractor at the rear of the cab pivots the pivot link between vertically upright extending and downward extending positions. A support link has an upper end pivotally connected to the deflector panel and a lower end pivotally connected to the pivot link so that rearward pivotal movement of the pivot link swings the lower end of the support link rearwardly and downwardly to withdraw the support link from support of the air deflector panel. The collapsible toggle linkage stores adjacent the cab rear wall for ready handle access by the operator for subsequent raising of the deflector panel. A telescoping spring device acts between the cab roof and the deflector panel to assist upward pivotal movement of the pivot link and extension of the collapsible toggle linkage to raise the deflector panel. A releasable latch is provided to retain the collapsible toggle linkage in both the extended and collapsed positions. A pair of such collapsible linkages are preferably provided in laterally spaced relation and connected by a handle extending therebetween to enable simultaneous pivotal movement of the collapsible toggle linkages between the extended position raising the collector panel and collapsed position lowering the deflector panel.

4 Claims, 12 Drawing Figures

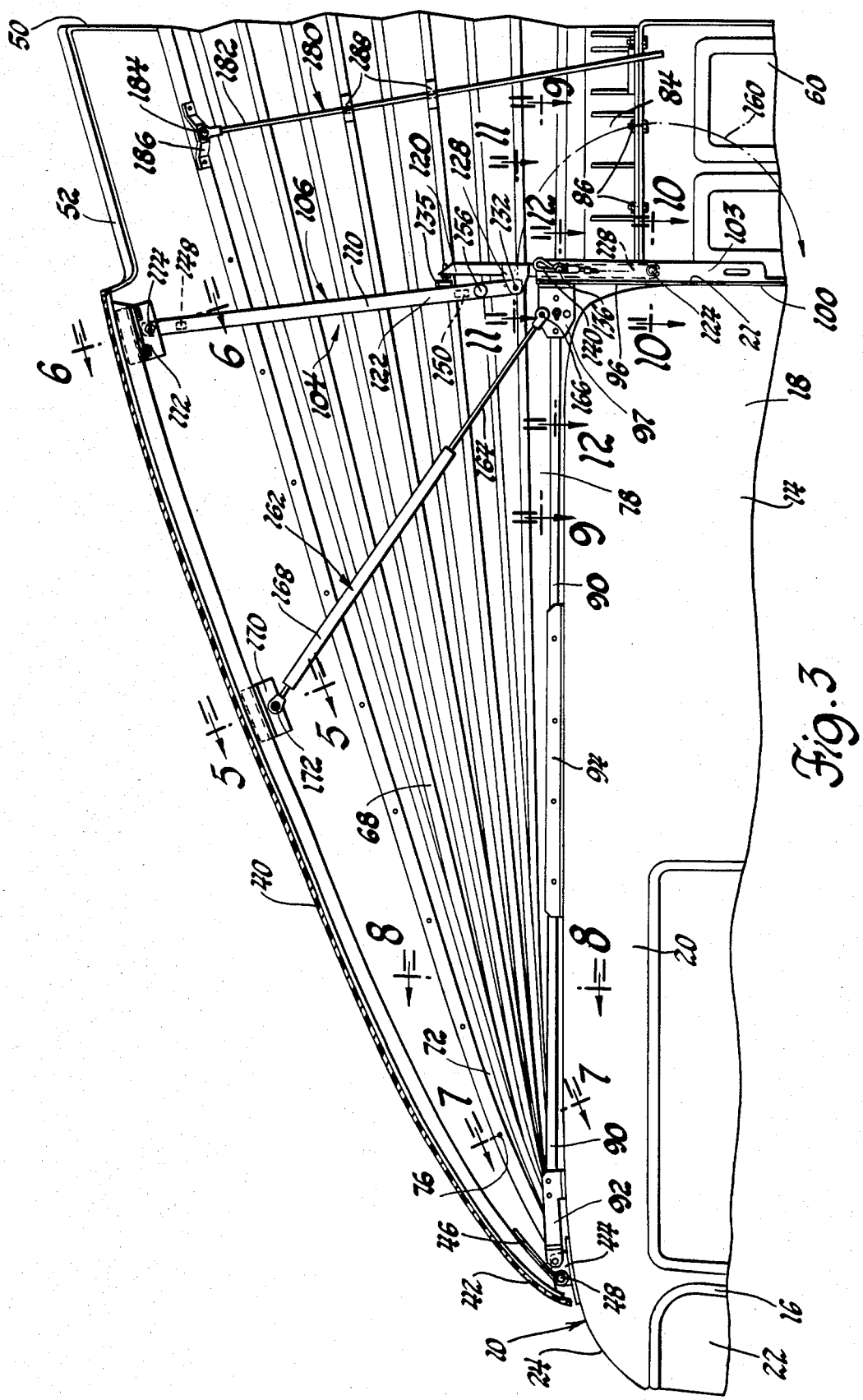

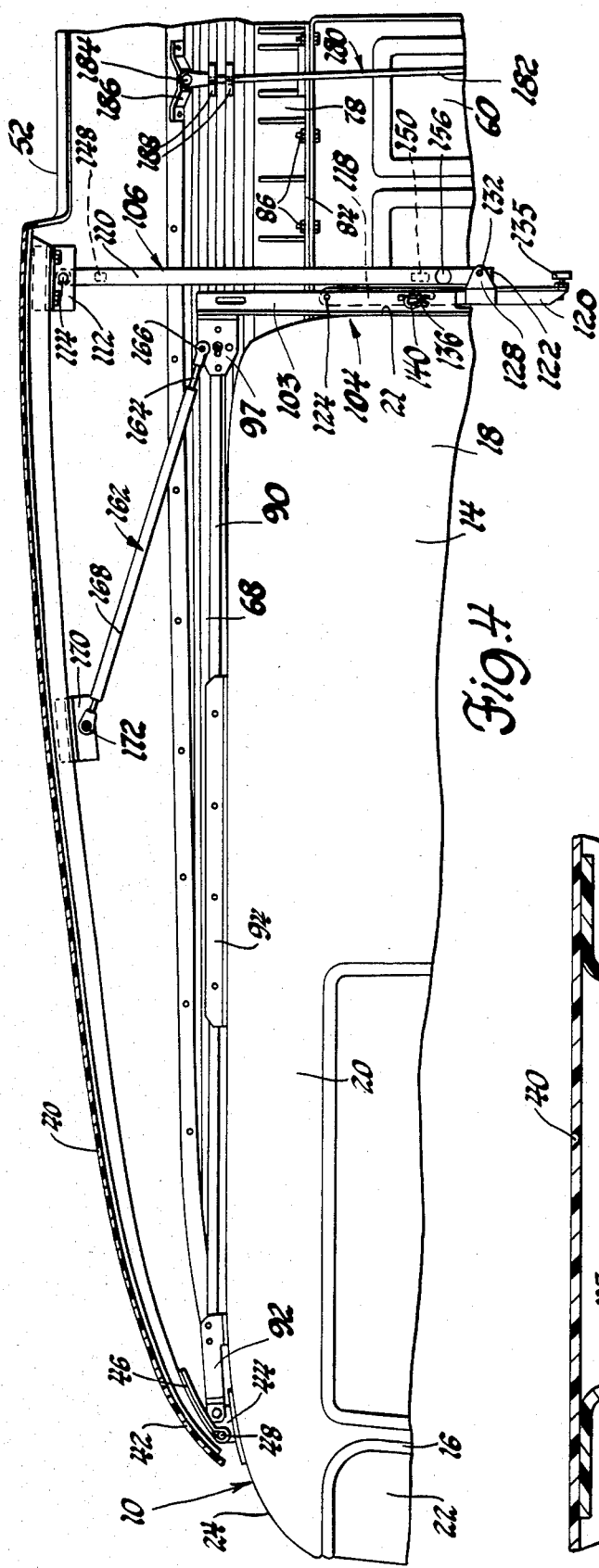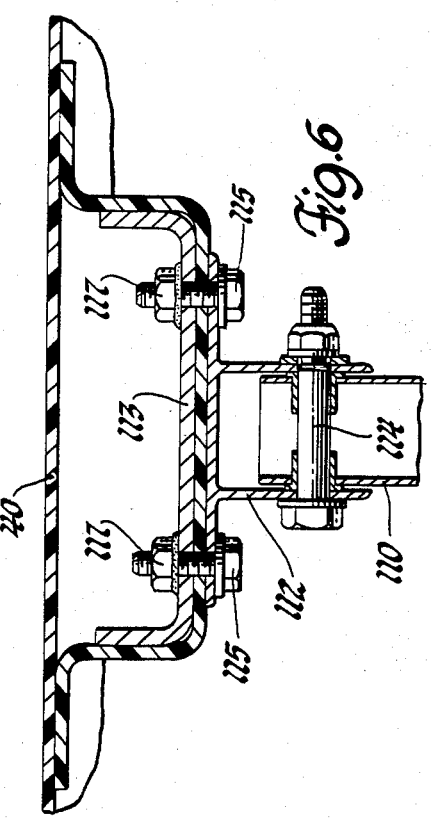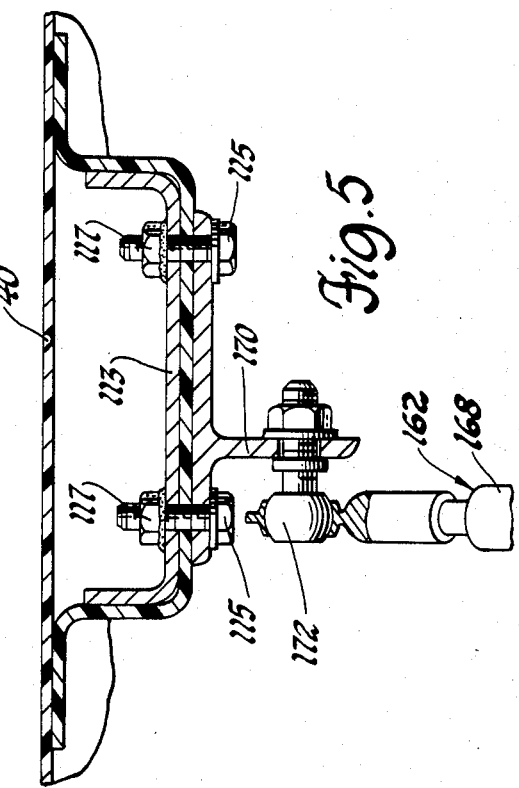

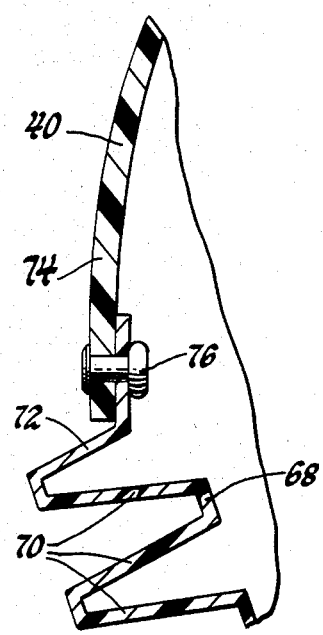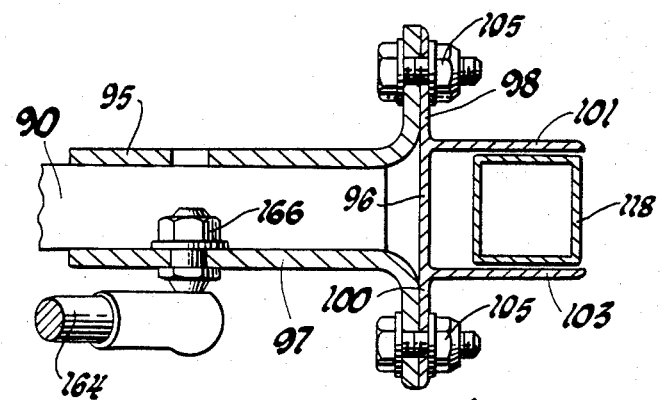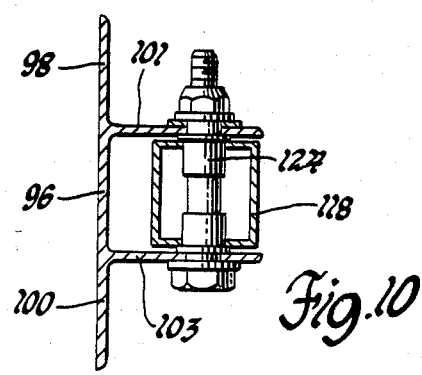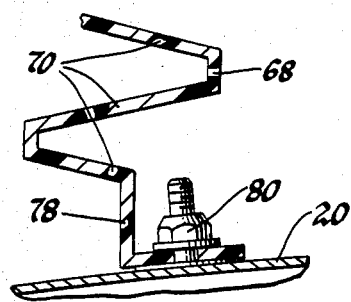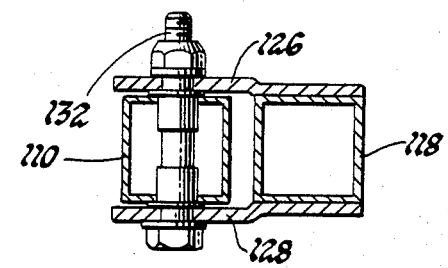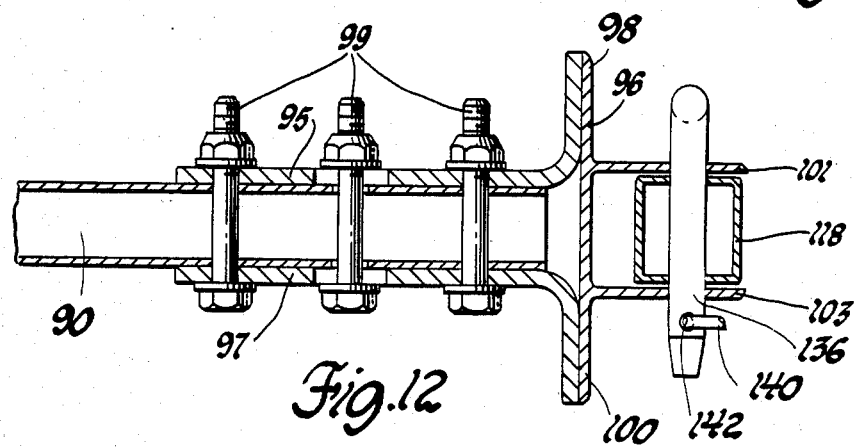

SUPPORT FOR COLLAPSIBLE DRAG REDUCER

The invention relates to an aerodynamic deflector panel hingedly mounted on the roof of a tractor in a tractor trailer vehicle and more particularly provides a collapsible toggle support mechanism for supporting the deflector panel at a raised air deflecting position and collapsing the deflector panel to a stored position upon the cab roof.

BACKGROUND OF THE INVENTION

It is known to provide a roof mounted air deflecting panel which is hingedly mounted for pivotal movement relative to the cab roof.

One such air deflecting device is disclosed in Taylor et al U.S. Pat. No. 4,165,543, assigned to the assignee of this invention and having an angle adjustment device comprised of a screw thread extension rod. Other patents such as Taylor U.S. Pat. No. 4,082,340; Geiger U.S. Pat. No. 3,947,065; Johnson et al U.S. Pat. No. 3,768,854; Webb U.S. Pat. No. 3,794,372; Adams U.S. Pat. No. 3,596,974 disclose various mechanical devices for controlling the angular position of the deflector panel in order to optimize the aerodymanic performance or to lower the deflector from a raised air deflecting position to a stored position on the vehicle roof.

The present invention provides a new and improved collapsible support for a deflector panel mounted atop the tractor of a tractor trailer vehicle and enables low effort manual movement of the deflector panel between raised and lowered positions by an operator standing on the tractor rearward of the tractor cab.

SUMMARY OF THE INVENTION

A support mechanism for moving a roof top pivotally mounted air deflector panel between raised and lowered positions includes a collapsible toggle linkage having a support link and a pivot link. The pivot link is pivotally mounted on the cab rear wall and has a handle by which an operator standing on the tractor at the rear of the cab pivots the pivot link between vertically upright extending and downward extending positions. A support link has an upper end pivotally connected to the deflector panel and a lower end pivotally connected to the pivot link so that rearward pivotal movement of the pivot link swings the lower end of the support link rearwardly and downwardly to withdraw the support link from support of the air deflector panel. The collapsible toggle linkage stores adjacent the cab rear wall for ready handle access by the operator for subsequent raising of the deflector panel. A telescoping spring device acts between the cab roof and the deflector panel to assist upward pivotal movement of the pivot link and extension of the collapsible toggle linkage to raise the deflector panel. A releasable latch is provided to retain the collapsible toggle linkage in both the extended and collapsed positions. A pair of such collapsible linkages are preferably provided in laterally spaced relation and connected by a handle extending therebetween to enable simultaneous pivotal movement of the collapsible toggle linkages between the extended position raising the collector panel and collapsed position lowering the deflector panel.

Accordingly, the object, feature and advantage of the invention resides in the provision of a collapsible toggle linkage acting between the vehicle cab and pivotally mounted deflector and manually operable between an extended position raising the deflector panel to an air deflecting position and a collapsed position in which the toggle linkage is stored adjacent the rear wall of the cab for convenient access to the operator.

A further object, feature and advantage of the invention resides in the provision of a collapsible toggle linkage movable between extended and collapsed positions for moving a hinged deflector panel between air deflecting and stored positions in conjunction with a telescopicaly extensible spring device acting to assist return of the deflector panel to the raised position.

DESCRIPTION OF THE DRAWINGS

These and other objects, features and advantages of the invention will become apparent upon consideration of the specification and the appended drawings in which:

FIG. 3 is a side elevational sectional view taken in the direction of arrows 3—3 of FIG. 1 and showing the drag reducer raised to the normal air deflecting position;

FIG. 4 is a view similar to FIG. 3 but showing the drag reducer collapsed to the stored position; and FIGS. 5 through 12 are sectional views taken in the direction of the correspondingly designated arrows of FIG. 3.

DESCRIPTION OF THE PREFERRED EMBODIMENT

Figure 1:
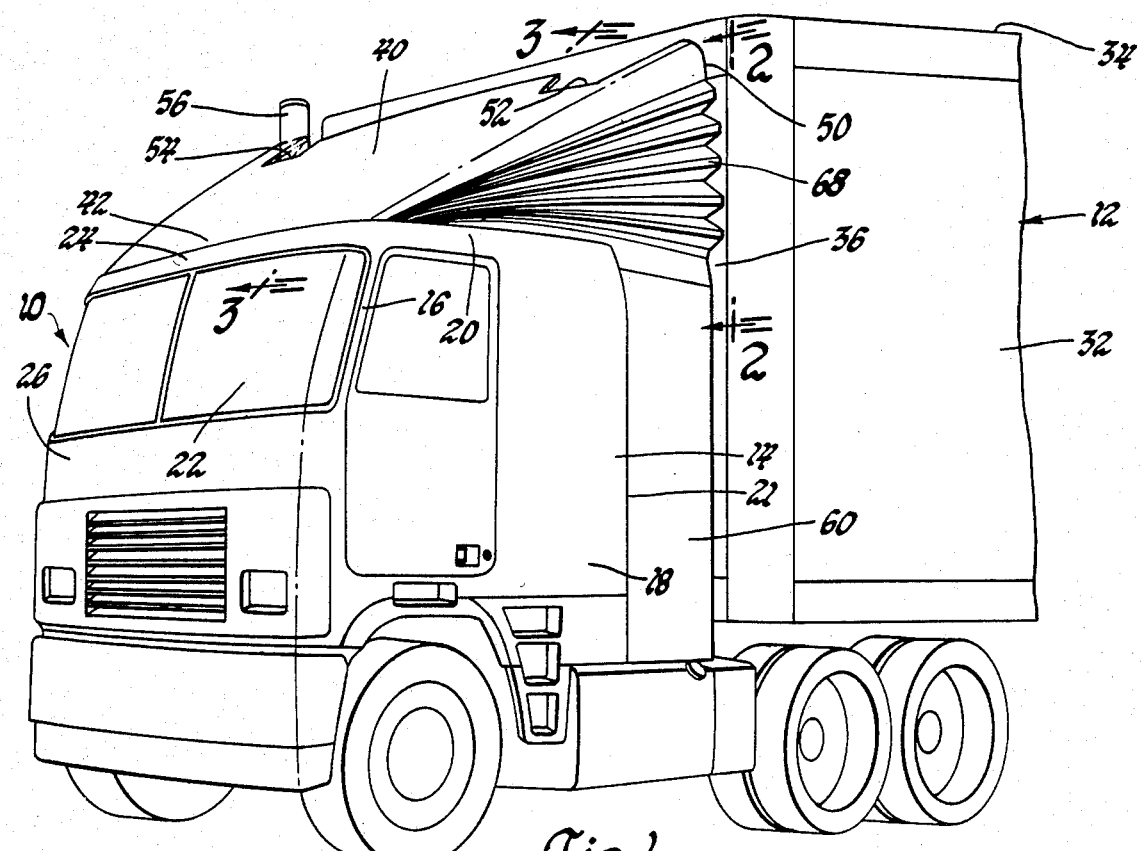
FIG. 1 is a perspective view of a tractor trailer vehicle having a drag reducer according to the invention.

Referring to FIG. 1, the conventional tractor trailer vehicle includes a tractor 10 and a trailer 12. The tractor 10 has a sleeper cab-over-engine configuration, but alternatively could be a nonsleeper cab-over-engine or a conventional configuration. The cab 14 of the tractor 10 includes windshield pillars 16, cab sidewalls 18, and a cab rear wall 21 which support the cab roof 20. Windshield 22 is flush with windshield pillar 16, a windshield header 24, and a front panel 26 of the cab 14 so that the cab 14 presents a bluff frontal contour to the approaching airstream.

The conventional trailer 12 has a rectangular shape and includes sides 32, a roof 34 and a front wall 36. The cab 14 of the tractor 10 and the front wall 36 of the trailer wall are spaced longitudinally of one another so that the tractor 10 can turn relative to the trailer 12. The roof 20 of the tractor 10 is at a lower elevation than roof 34 of the tractor 12.

As seen in FIGS. 1 and 3, a rigid deflector panel 40, preferably of resin transfer molded fiberglass, has a leading edge 42 which is disposed closely adjacent the windshield header 24. The leading edge 42 of the rigid deflector panel 40 is pivotally mounted on the cab roof 20 generally adjacent the windshield header 24 by a pivot bracket 44 attached to the cab roof 20 and a hinge link 46 which is suitably bolted to the rigid deflector panel 40 and connected to the anchor bracket 44 by a pivot bolt 48. A pair of these hinges is employed with one such hinge at each of the front corners of the deflector panel 40. The trailing edge 50 of the deflector panel 40 is recessed at 52 and 54 to accommodate the exhaust stack or engine air intake stack 56. The deflector panel 40 overhangs the rear wall 21 and terminates short of the trailer front wall 36 so that the tractor can articulate relative to the trailer 12.

Figure 2:
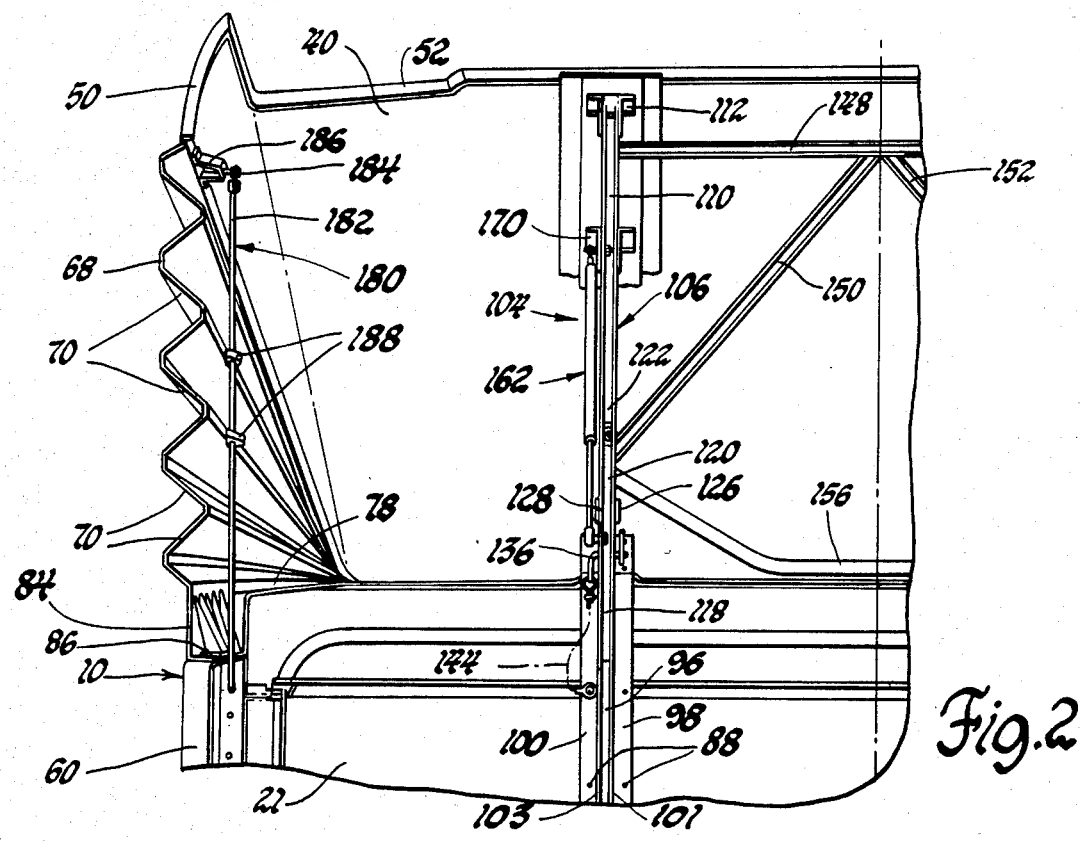
FIG. 2 is a view taken in the direction of arrows 2—2 of FIG. 1 and showing a rear elevation view of the drag reducer together with the collapsible support and guide rod therefor.

Referring to FIGS. 1, 2 and 3, it is seen that an extender panel 60 is attached to the rear wall 21 of the cab and aligns generally with the cab side wall 18 to aerodynamically extend the cab side wall 18 rearwardly toward the front wall 36 of the trailer. The extender panel terminates short of the trailer front wall 36 so that the tractor 14 can articulate relative to the trailer 12. A like extender panel 60 is provided at the other side of the cab 14. The extender panels are preferably constructed of molded fiberglass and have integrally formed stiffening ribs and the like which provide a wind and vibration resistant structural stiffness and facilitate attachment of the extender panels 60 to the cab rear wall 18 by appropriate bracketry, not shown.

Referring again to FIGS. 1 and 2, it is seen that the leading edge 42 of the deflector panel 40 is narrower than the trailing edge 50 thereof so that the deflector panel 40 has the plan form configuration of a truncated isosceles triangle. Furthermore, it is seen that the nonparallel side edges of a deflector panel 40 are connected to the cab roof 20 and the extender panels 60 by bellow-stype air deflecting side members 68. The side members 68 are molded of a semi-rigid urethane and include a plurality of foldably interconnected segments 70 of a triangular shape which fold and unfold relative one another to accommodate variation in the angle of the deflector panel 40 relative to the cab roof 20.

As best seen in FIG. 7, the nonparallel side edge 74 of the rigid deflector 40 are curved downwardly and attached to the topmost segment 72 of the side members 68 by a plurality of rivets 76. FIG. 8 shows that the bottommost segment 78 of the side member is attached to cab roof 20 by nut and bolt assemblies 80. FIGS. 2 and 4 show that the rearwardmost portion of the side member 68 includes a flap 84 which depends from the bottommost segment 78 and is attached to the top of the extender panels 60 by a plurality of fasteners 86.

The angular position of the deflector panel 40 is varied between a raised wind deflecting position of FIGS. 1 and 3 and a lowered position of FIG. 4 by a support mechanism indicated generally at 104. The support mechanism 104 includes a pair of collapsible linkages, one of which is shown at 106, which are laterally spaced apart and act between the deflector panel 40 and a vertical support 96 having legs 98 and 100 attached to the rear wall 21 of the cab 14 by bolts 88. The vertical support 96 is braced by a longitudinal extending rail 90 having its forward end attached to the roof by a bracket 92, its intermediate portion attached to the cab roof by a bracket 94 and its rearward end attached to the vertical support 96 by brackets 95 and 97 and nut and bolt assemblies 99 and 105 as seen in FIGS. 9 and 12.

As seen best in FIGS. 2 and 3, the collapsible linkage 106 includes a support link 110 of square tubing having its upper end pivotally connected to the deflector panel 40 via a bracket 112 and a pivot bolt 114 as shown in FIG. 6. The bracket 112 is attached to reinforcement 113 molded into the deflector panel 40 by screws 115 and weld nuts 117. The collapsible linkage 106 also has a pivot link 118 of square tubing inluding an upper end portion 120 which has a generally coextensive parallel relationship with a lower end portion 122 of the support link 110. The lower end of the pivot link 118 is pivotally connected to channel walls 101 and 103 of the vertical support 96 by a pivot bolt 124 as seen in FIG. 10. The lower end of the support link 110 is pivotally connected to a central portion of the pivot link 118 by brackets 126 and 128 which are welded or otherwise suitably attached to the pivot link 118 and surround the support link 110 as shown in FIG. 11. A pivot bolt 132 extends through the brackets 126 and 128 and through the support link 110.

As best seen in FIG. 3, the collapsible linkage 106 supports the deflector panel 40 at the raised wind deflecting position when the pivot link 118 and the support link 110 are established in the extended and generally coextensive parallel relationship shown in FIG. 3. This coextensive relationship is established by a screw mounted adjustable bumper pad 135 which is mounted at the upper end of the pivot link 118 and bears against the support link 110. This generally coextensive and extended position of the pivot link 118 and support link 110 is maintained by a latch pin 136, best seen in FIG. 12, which extends through aligned apertures in the channel walls 101 and 103 of the vertical support bracket 96 and aligned apertures in the pivot link 118. A retainer pin 140 extends through a hole 142 in latch pin 136 and is selectively removable therefrom to permit removal of the latch pin 136. The latch pin 136 is preferably connected to the vertical support 96 by a tether cable 144 so that the latch pin 136 is not inadvertently mislaid.

Referring to FIG. 2, it is to be understood that a second collapsible linkage like the collapsible linkage 106 shown therein is provided at the other side of the deflector panel 40 and is not shown in the drawing. The collapsible linkages 106 are connected by braces 148, 150 and 152 as well as a handlebar 156 which extend between the support links 110 of the collapsible linkages 106. The handlebar 156 is bowed downwardly as seen in FIG. 2 so that it is accessible to a vehicle operator standing on the tractor frame rails behind the cab 14.

As best seen by comparing FIGS. 3 and 4, the deflector panel 40 is lowered from the raised position of FIG. 3 to the stowed position of FIG. 4 by collapsing the collapsible linkage 106. This collapse is achieved by the vehicle operator withdrawing the retaining pin 140 from the latch pin 136 and then removing the latch pin 136 from the vertical support 96 and the pivot link 118. The handlebar 156 is then gripped and pulled rearwardly and downwardly so that the pivot link 118 is caused to pivot about the pivot bolt 124 at the lower end thereof. This pivoting movement of the pivot link 118 causes the pivot bolt 132 connecting the pivot link 118 with the support link 110 to move in the arcuate path shown by the arrow 160 of FIG. 3. Accordingly, the lower end of the support link 110 is pivoted rearwardly and withdraws the support link 110 downwardly from support of the deflector panel 110. The pivoting movement of the pivot link 118 continues through approximately 180° degrees of rotation until the pivot link 118 obtains the vertical position of FIG. 4 in generally parallel relationship with the support link 110. The latch pin 136 is then reinstalled between the pivot link 118 and the vertical support 96 to retain the collapsible linkage 106 in the collapsed position and thereby retain the deflector panel 40 at its stowed position of FIG. 4.

Return of deflector panel 40 to the raised position of FIG. 3 is performed by lifting the handlebar 156 upwardly and outwardly to effect pivoting movement of the pivot link 118 and return the support link 110 to its position of FIG. 3. This lifting of the deflector panel 40 is assisted by a gas spring assembly 162 or the like which has a rod 164 connected to the bracket 97 by a pivot 166 shown in FIG. 9. The rod 164 telescopes within a cylinder 168 connected to a bracket 170 of deflector panel 40 by a pivot 172 shown in FIG. 5. In general, the gas spring assembly 162 has a compressed gas housed therewithin which acts to extend the length of the gas spring 162 so that the deflector panel 10 is urged to the raised position.

Referring to FIGS. 2 and 3 there is shown a guide rod assembly 180 which functions to support and guide the side member 68. The guide rod assembly 180 includes a rod 182 which is pivotally connected to the deflector panel 40 by a pivot pin 184 and bracket 186. A plurality of eyelets 188 are connected to the side member 68 at the juncture between the triangle-shaped segments 70 and slidably receive the guide rod 182. Accordingly, the guide rod 182 stiffens the side member 68 so that crosswind buffeting the side member 68 will not cause excessive bowing, flutter, or flapping of the side member 68. The guide rod 182 slides through the eyelets 188 upon movement of the deflector panel 40 between the raised and stowed positions and assures that the segments 70 fold neatly one upon the other when the deflector panel 40 obtains the stowed position of FIG. 4.

Thus it is seen that the invention provides a new and improved collapsible support mechanism 104 for an air deflector panel 40 mounted atop the tractor of a tractor trailer vehicle. Furthermore, the collapsible support is spring assisted by gas spring assembly 162 to enable low effort manual movement of the deflector panel 40 between raised and lowered positions by an operator standing on the tractor behind the tractor cab. The collapsible support mechanism 104 is a pair of toggle linkages which each include a pivot link 118 pivotally mounted upon or generally adjacent to the cab rear wall 21 below the roof for raising and lowering a support link 110 pivoted to the deflector panel 40. This provides a support mechanism which stores itself against the rear cab wall 21 when the collapsible support mechanism 104 is collapsed to lower the deflector panel 40 so that the collapsible support mechanism 104 is readily accessible and within reach of an operator standing on the tractor behind the cab to permit convenient return of the collapsible support to the extended position by the operator. Furthermore the provision of a handle bar 156 extending between the pair of such collapsible supports linkages acting between the deflector panel 40 and the tractor cab rear wall 21 enables simultaneous pivotal movement of the collapsible supports between the extended and collapsed positions.

While the best mode for carrying out the invention has been described in detail in reference to the preferred embodiment shown in the drawings, those skilled in the art will recognize various alternative designs and embodiments for practicing the invention as defined by the following claims:

The embodiments of the invention in which an exclusive property or privilege is claimed are defined as follows:

1. In combination with a tractor having a cab roof and a cab rear wall, a support mechanism for moving an air deflector panel pivoted to the cab roof between a pivotally raised air deflecting position and a lowered storage position in which the deflector panel is stored adjacent the cab roof comprising:

a collapsible toggle linkage including a support link having an upper end pivotally connected to the deflector panel and a lower end, a pivot link having a lower end pivotally mounted on the cab rear wall below the roof for pivotal movement between a raised position standing vertically upwardly and a lowered position depending vertically downwardly, and pivot means acting between the pivot link and the lower end of the support link whereby rearward pivotal movement of the pivot link about the lower end from the raised position thereof effects rearward arcuate movement of the lower end of the support link in an arcuate path rearwardly of the rear cab wall to withdraw the support link from support of the deflector panel whereby the air deflector panel is lowered and the collapsible linkage is stored adjacent the rear wall of the cab.

2. In combination with a rigid air deflector panel pivotally mounted on the cab roof of a tractor cab having a rear wall, a support mechanism for moving the deflector panel between a pivotally raised air deflecting position and a lowered storage position in which the deflector panel is stored upon the roof comprising:

a pair of collapsible linkages laterally spaced apart and acting between the deflector panel and the tractor cab, each such collapsible linkage including a support link and a pivot link, said support link having an upper end pivotally mounted to the rigid deflecting panel and a lower end, said pivot link having a lower end pivotally mounted on the tractor cab rear wall below the roof, a central portion pivotally connected to the lower end of the support link, and an upper end extending in generaly coextensive parallel relationship with the support link, the pivot link movable between a raised position standing vertically upwardly and a lowered position depending vertically downwardly;

releasable latch means acting to establish said links in a generally coextensive extended parallel position effectively maintaining the deflector panel at the raised position;

and handle means extending between the collapsible linkages to enable simultaneous pivotal movement of the pivot links in an arcuate path rearwardly away from the cab rear wall subsequent to release of the latch means to thereby carry the lower end of the support link in an arcuate path such that the support link effectively lowers the rigid deflector panel to a stored position stored upon the cab roof and the collapsible linkages are stored adjacent the rear wall of the cab.

3. In combination with a rigid air deflector panel pivotally mounted on the cab roof of a tractor cab having a rear cab wall, a support mechanism for moving the deflector panel between a pivotally raised air deflecting position and a lowered storage position in which the deflector panel is stored upon the roof comprising:

a pair of collapsible linkages laterally spaced apart and acting between the deflector panel and the tractor cab, each such collapsible linkage including a support link pivotally mounted to the rigid deflecting panel, a pivot link pivotally mounted on the rear cab wall of the tractor below the roof for movement rearwardly of the cab rear wall between a raised position standing vertically upwardly and a lowered position depending vertically downwardly, and means pivotally connecting the support link and the pivot link, said collapsible linkages being movable between extended positions establishing the deflector panel at a raised air deflecting position and collapsed positions to lower the deflector panel to a stored position upon the cab roof;

and a telescoping spring means acting between the tractor cab and the deflector panel to urge the deflector panel to the raised air deflecting position.

4. In combination with a tractor having a cab roof and a cab rear wall, a support mechanism for moving an air deflector panel pivoted to the cab roof between a pivotally raised air deflecting position and a lowered storage position in which the deflector panel is stored adjacent the cab roof comprising:

a pivot link having an end pivotally mounted on the cab rear wall below the cab roof and another end having a handle associated therewith to enable manual pivotal movement of the pivot link in an arcuate path rearwardly of the cab rear wall between an upward vertical position and a downward vertical position;

and a support link having an upper end pivotally connected to the rigid deflector panel and a lower end pivotally connected with said another end of the pivot link whereby the manual pivotal movement of the pivot link between the upward extending position and the downward extending position in an arcuate path rearwardly of the cab rear wall raises and lowers the deflector panel relative to the cab roof while the handle associated with the pivot link remains always outside the space between the cab roof and the deflector panel.

* * * * *